US008363295B2

(12) United States Patent
Wilson et al.

(10) Patent No.: US 8,363,295 B2
(45) Date of Patent: Jan. 29, 2013

(54) COMPUTER GENERATED HOLOGRAM (75) Inventors: Christopher Paul Wilson, Shropshire (GB); Colin David Cameron, Worcestershire (GB)

(73) Assignee: F. Poszat Hu, LLC, Wilmington, DE (US)

(*) Notice: Subject to any disclaimer, the term of this patent is extended or adjusted under 35 U.S.C. 154(b) by 384 days.

(21) Appl. No.: 12/830,974

(22) Filed: Jul. 6, 2010
(Under 37 CFR 1.47)

(65) Prior Publication Data
US 2010/0271678 A1 Oct. 28, 2010

Related U.S. Application Data (63) Continuation of application No. 11/948,914, filed on Nov. 30, 2007, now Pat. No. 7,782,510.

(60) Provisional application No. 60/861,984, filed on Dec. 1, 2006.

(51) Int. Cl.
*G03H 1/08* (2006.01)
(52) U.S. Cl. .......................................................... 359/9
(58) Field of Classification Search .................. 359/9
See application file for complete search history.

(56) References Cited

U.S. PATENT DOCUMENTS
6,219,435 B1    4/2001  Horikoshi et al.

FOREIGN PATENT DOCUMENTS
| JP | 2003263094 A | 9/2003 |
| WO | 02/39194 | 5/2002 |
| WO | 2006/041191 | 4/2006 |
| WO | 2006/066906 | 6/2006 |

OTHER PUBLICATIONS

Lucente, Mark, "Holographic bandwidth compression using spatial subsampling", Optical Engineering, 35(6), (Jun. 1996), pp. 1529-1537.*
Ferri, L.C., "Visualizations of 3D Information With Digital Holography Using Laser Printers", Computers and Graphics, Elsevier, GB, vol. 25, No. 2, Apr. 1, 2001, pp. 309-321, (XP004232470).

* cited by examiner

*Primary Examiner* — Alessandro Amari
(74) *Attorney, Agent, or Firm* — Stolowitz Ford Cowger LLP (57) ABSTRACT A three dimensional display apparatus includes a diffraction panel for displaying a computer generated hologram and a look-up table. The look-up table includes a plurality of phase entries corresponding to a plurality of image points within a three dimensional image replay volume of the computer generated hologram. The apparatus further includes one or more processors configured to notionally divide the computer generated hologram into one or more hogels and to calculate diffraction fringe information for at least one of the hogels based on a selection of the phase entries.

20 Claims, 3 Drawing Sheets

COMPUTER GENERATED HOLOGRAM

This application claims priority to U.S. Provisional Application Ser. No. 60/861,984 filed on Dec. 1, 2006, and is a continuation of U.S. patent application Ser. No. 11/948,914, the specifications of which are herein incorporated by reference in their entirety.

FIELD OF USE

Three-dimensional (3D) displays and computer generated holograms (CGH).

BACKGROUND

A variety of techniques are known for providing a viewer with the visual perception of a 3D image. However, only holography offers the potential to create true 3D images that have all the human visual system depth cues that a natural object is perceived as possessing.

Classical interferometric holography is well known. Light scattered from an object interferes with a reference beam and forms an interference pattern which can be recorded, for example, on photographic film. To reconstruct an image, the recorded interference pattern modulates a conjugate reference beam of light so that a replica of the original wavefront is reproduced. This wavefront further propagates in space and gives the viewer, or viewers, the full impression that the object really exists in space.

A variety of computer based holographic techniques are also known in which the object used to form the hologram exists as a mathematical description. The physical interference of light is replaced by a mathematical step to calculate an appropriate interference pattern. The calculated pattern is typically termed a computer generated hologram (CGH) and may be written to any device capable of modulating light. If an updateable 3D image is required the CGH can be written to a reconfigurable diffraction panel, such as a spatial light modulator (SLM).

Coherent ray tracing (CRT) is one known technique for calculating a CGH. CRT methods essentially implement a 3D scalar diffraction integral and thus simulate the propagation of light in a conventional interferometric hologram recording. The core of the calculation is a linear summation of the E-field contribution from each point on the virtual 3D object to each pixel forming the CGH. To produce a CGH with acceptable image size and field of view using CRT techniques requires many ray tracing calculations and thus has an extremely high associated computational load. CRT methods are thus not particularly suited to producing rapidly updateable 3D images.

A CGH can also be calculated using a so-called Diffraction Specific (DS) algorithm of the type described by Lucente in "Diffraction specific fringe computation for electro-holography", by M Lucente, Doctoral thesis dissertation, MIT Department of Electrical Engineering and Computer Science, September 1994; "Computational holographic bandwidth compression", M Lucente, IBM Systems Journal, October 1996; and "Holographic bandwidth compression using spatial sub sampling", M Lucente, Optical Engineering, June 1996.

The DS algorithm described by Lucente quantizes the CGH in both spatial and spectral domains. Spatial quantization is achieved by dividing the CGH into a plurality of areas, termed hogels, that each contain a plurality of pixels. The frequency spectrum of each hogel is also quantized such that each hogel has a plurality of frequency elements known as hogel vector elements. A pre-computed diffraction look-up table (LUT) is provided to map selected locations, or nodes, in the image volume to each hogel and to various hogel vector elements of that hogel.

In use, a geometric representation of the 3D image to be displayed is generated and, for each hogel of the CGH, appropriate hogel vector elements are selected from the diffraction LUT of the particular 3D image. Each of the selected hogel vector elements is then multiplied with a basis fringe pre-computed for the particular hogel and the resulting decoded fringes are accumulated to generate a resultant decoded fringe for that hogel. The process is repeated for each hogel enabling a complete CGH to be formed. The resultant 3D image is generated by the diffraction of light from the complete set of hogels that form the CGH.

The Lucente DS algorithm thus allows the number of image point locations, or nodes, that are stored in the diffraction look up table to be selected of the required resolution of the 3D image. More nodes will give a better image resolution, but will require more computing power to generate the CGH. Controlling the number of nodes in this manner allows image quality to be traded for reduced processing time. This DS algorithm thus enables control over the information content of the CGH such that unnecessary detail in the resultant 3D image (e.g. detail that cannot be perceived by the human eye) can be omitted.

Although the computational load associated with the Lucente DS algorithm is less than CRT methods, the calculations have still been found to take a significant amount of processing power. In particular, the computational load associated with the Lucente DS algorithm remains too high to allow dynamic 3D image production with adequate resolution using acceptable levels of computing power.

WO 02/39194 describes a method for reducing the computational load associated with a DS algorithm by providing an alternative diffraction table that stores decoded fringe information, rather than hogel vector elements, for each hogel. The use of such pre-calculated decoded fringe information in the DS algorithm means that the step of decoding hogel vector elements using basis fringes is not required; the diffraction table stores fully decoded fringes that can be written directly to the diffraction panel. This results in faster generation of the CGH because, unlike the Lucente DS method, the decoding calculations can be performed off-line. A disadvantage of this technique is that a large look up table is required to hold all the decoded fringe entries.

WO 02/39192 describes a further variation to the DS algorithm in which a multiple point sampling technique is used such that each hogel can generate a curved wavefront rather than a planar wavefront. This allows the wavefront from a single hogel to generate at least one point in the 3D image volume and/or permits defects or aberrations in the optical system to be corrected or reduced. The generation of a curved wavefront can also increase the quality of the image produced by the system.

BRIEF DESCRIPTION OF THE DRAWINGS

The various embodiments will now be described, by way of example only, with reference to the following drawings in which.

DETAILED DESCRIPTION

Figure 1:
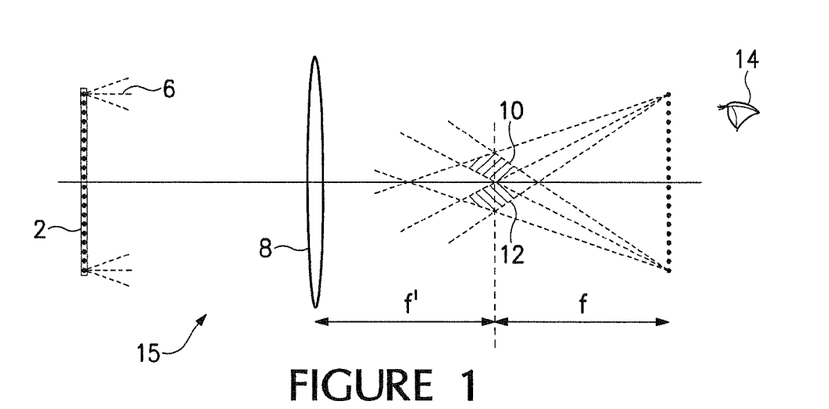
FIG. 1 illustrates in diagrammatic form the geometry of CGH replay optics.

Referring to FIG. 1, the replay optics 15 of a Computer Generated Hologram (CGH) system is shown. A diffraction panel 2 transmits a set of plane waves, within a given diffraction cone 6, through a Fourier lens 8. The plane waves are refracted by the Fourier lens 8 towards a three-dimensional image volume 10. The maximum angle of diffraction of the plane waves as defined by the cone 6 dictates the size of the image volume 10. As the diffracted waves radiate symmetrically from the diffraction panel 2, a conjugate image volume 12 is also formed adjacent the image volume 10. In practice, the conjugate image 12 is usually masked out.

FIG. 1 only shows plane waves radiating from two areas of the panel 2. However, in practice, each hogel on the panel 2 will be radiating such waves. Writing an appropriate CGH to the diffraction panel 2 allows a viewer in the viewing zone 14 to see a true 3D image in the image volume 10.

Figure 2:
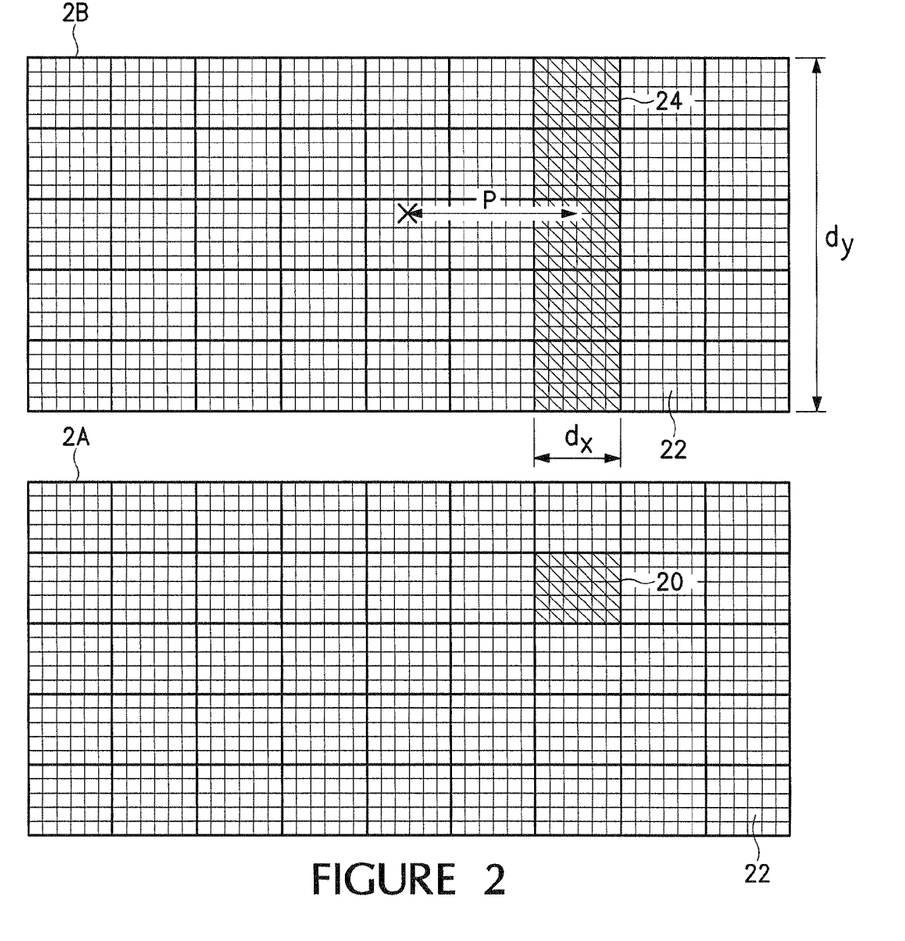
FIG. 2 illustrates in diagrammatic form a CGH divided into hogels, for both a full parallax and a horizontal parallax system.

FIG. 2 illustrates in diagrammatic form a CGH divided into hogels, for both a full parallax and a horizontal parallax system shown as two different diffraction panels. The first diffraction panel 2a implements a full parallax system, and the second diffraction panel 2b implements a horizontal parallax system. Diffraction panel 2a comprises a spatial quantization in which the CGH is written into a 2D array of hogels. Each hogel (for example 20) is shown having a plurality of pixels 22 in two dimensions. The 2D array of hogels makes it suitable for implementing a full parallax (FP) system. The number of pixels shown present in each of the hogels (for example 20) is shown figuratively only. In practice there would be approximately 2000 to 4000 pixels in each hogel dimension.

Diffraction panel 2b comprises a horizontal parallax only (HPO) system, where each hogel 24 has only one pixel in the vertical dimension, but approximately 2000 to 4000 in the horizontal dimension. A HPO system may thus be arranged to provide a fringe pattern that diffracts only in the horizontal dimension, while having image information in the vertical plane similar to a normal, non diffracting image such as may be displayed on a standard, non diffractive display. This reduces the overall pixel count and is thus faster to calculate. It would be appreciated by one skilled in the art that various embodiment may also be implemented having vertical only parallax or different amounts of horizontal vertical parallax.

Figure 3:
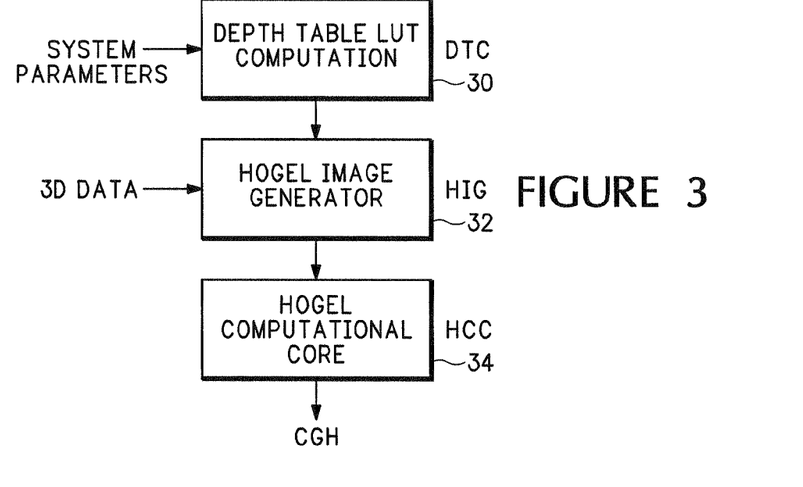
FIG. 3 illustrates a method of computing a CGH.

FIG. 3 illustrates a method of computing a CGH. At operation 30, a Depth Table Computation (DTC) is performed for each hogel. The DTC step separates the 3D image volume of the replay system into a plurality of depth planes. Phase information is then computed for multiple image points in each depth plane. Operation 30 can be performed off-line (i.e. it is image independent and non-time critical) and the information is stored in a look-up table (LUT) for real time use.

At operation 32, a Hogel Image Generator (HIG) is performed using standard computer graphics rendering techniques. The three dimensional image to be displayed is broken down into the color and depth information that each hogel displays.

At operation 34, a Hogel Computation Core (HCC) generates (for each depth plane of each hogel) a phase value for each non-zero color pixel of the image produced in the HIG operation 32. A Fourier transform is then performed on the color image for the given depth plane before the transformed data is point-wise multiplied with the pre-computed DTC phase information. The result may be accumulated into the hogel and repeated for each depth plane.

Figure 4:
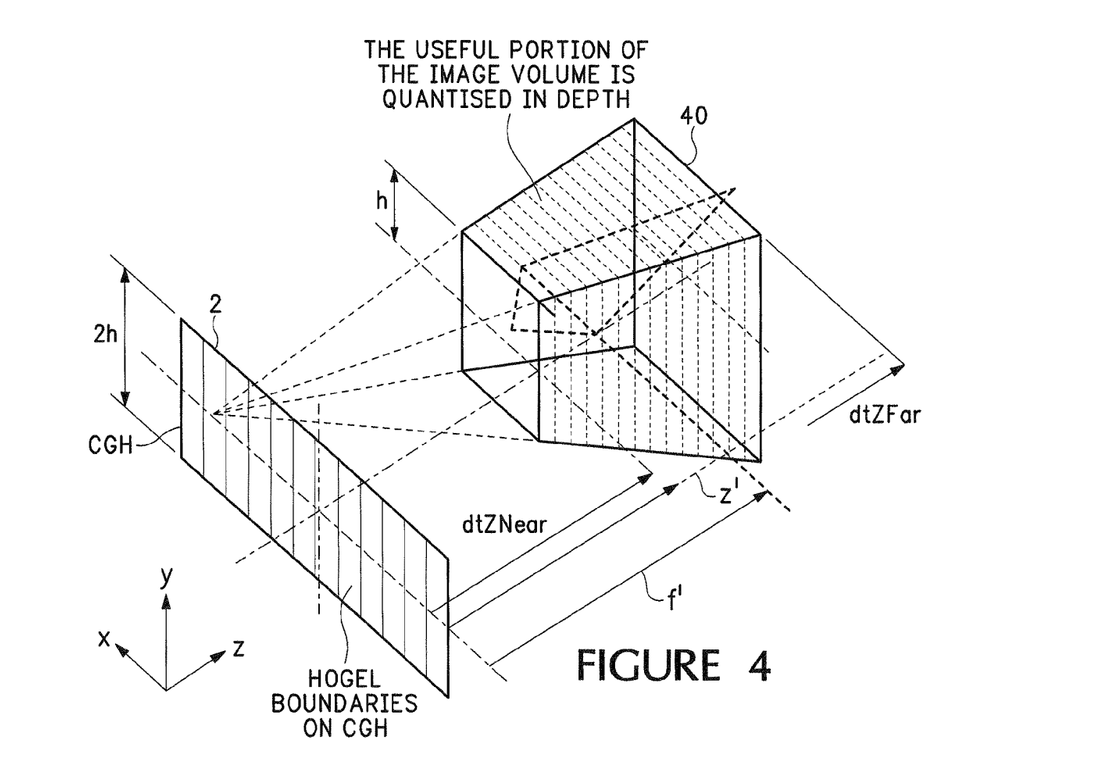
FIG. 4 illustrates the principle of depth quantization.

Referring to FIG. 4, the principle of depth quantization is illustrated. Depth quantization may be used to produce or compute a look-up table. The diffraction panel 2 of the system is divided into a plurality of hogels to implement a horizontal parallax only arrangement of the type described above. For clarity, FIG. 4 does not show any of the replay optics used to replay a 3D image from the 2D CGH pattern written to the diffraction panel.

In order to produce the look-up table, the virtual 3D image volume is divided into a plurality of depth planes 40. The DTC operation 30 determines the phase factor which, in combination with a FFT produced in the HCC described in more detail below, will project the complex plane description at the required depth in the image volume. In other words, the LUT is used to store information on the phase factors that may be used to shift an image point replayed from a hogel of the CGH from the Fourier plane to a computed depth plane.

In various embodiments, the depth planes of the 3D image points are computed with respect to the CGH rendering plane that is located at the plane where the image of the CGH data plane is formed by the optical replay system in viewer space. Herein we use by convention "f" to identify the distance between the system Fourier plane and the CGH rendering plane, and "z" to specify the distance from the CGH rendering plane to a given image point.

The quadratic phase factor used in the DTC operation 30 has two components; a quadrature phase factor to change the apparent depth plane and a linear phase factor to accommodate the skew from performing an off-axis FFT (i.e. for hogels located away from the optical axis of the system). The phase angle ($\theta$) is thus given by:

$$\theta = \frac{\pi}{\lambda}\left(\frac{1}{z} - \frac{1}{f}\right)\Delta_2 - \frac{2\pi}{\lambda}\left(\frac{1}{z} - \frac{1}{f}\right)\Delta \cdot p$$

where $\Delta$ is the pixel offset, noting $\Delta = dx + dy$ and $\Delta_2 = dx^2 + dy^2$; $\lambda$ is the wavelength, dx is effective pixel X dimension on the hogel of the CGH rendering plane, dy is the effective pixel Y dimension on the hogel of the CGH rendering plane and p is the position of the hogel centre relative to the optical axis. Referring again to FIG. 2b, dx, dy and p are shown. As noted above, "f" is the distance between the Fourier plane and the CGH rendering plane and "z" is the distance from the CGH rendering plane to a given image point.

The look-up table produced by the DTC operation 30 thus has a phase entry for each pixel of each plane within the image. The look up table thus contains, for a given number of image points, significantly fewer entries than DS algorithms in which the LUT contains, for example, a fully decoded diffraction fringe for each point of the 3D image volume. As described above, the Lucente DS technique uses a look-up table that contains a list of hogel vector elements for each point in the 3D image that require subsequent decoding. Although the method described in WO 02/39194 reduces the computational load required to calculate a CGH, it uses a look-up table comprising a set of fully decoded diffraction fringes (i.e. the information that is to be written to each pixel of the hogel to replay the desired diffraction fringe) for each point of the 3D image.

The reduction in size of the look-up table compared to DS algorithms can be illustrated by considering a horizontal parallax only CGH with a 2048 image point lateral resolution (spatial resolution at a given depth plane), 1024 hololines (image rows), 128 quantized depth planes and 4096 lateral hogel pixels. For a DS algorithm of the type described in WO 02/39194 the size of the look up table would be given by the product of the number of image points, the number of depth plane and the number of entries per image point. A LUT having $1 \times 10^9$ entries (i.e. 2048×128×4096) would thus be used for the CGH example given above. In one embodiment, a LUT disclosed herein includes only $512 \times 10^3$ (i.e. 2048×128×2). The size of the LUT may thus be reduced by a factor of 2048.

The look-up table may be computed off-line, and stored for subsequent use in the HCC operation 34 and described in more detail below with reference to FIG. 5.

The hogel image generator (HIG) operation 32 may be used to convert 3D image data (e.g. from a computer aided design package) into a form that is suitable for subsequent use in the HCC operation 34. The HIG operation 32 may include a rendering operation that computes color and depth information and may be implemented using either ray tracers or rasterisers. The image may be rendered with respect to each hogel on the CGH, wherein the frustum that is defined for each hogel is based on the usable image volume produced by the Fourier based CGH system. In other words, the maximum diffraction angle of the CGH defines a frustum for each hogel.

The output of the HIG, for each hogel, may include a two dimensional set of image points for each of n depth planes spaced δz apart. In other words, the 3D image to be displayed by each hogel may be split into multiple image slices at different depth planes. It should be noted that the spacing between depth planes need not be uniform; i.e. the depth planes may be spaced of the particular application. The depth planes into which the 3D image is split may correspond to the depth planes used in the DTC of operation 30 to produce the look-up table.

The spatial resolution of the rendered image may be varied but, for a HPO arrangement, may not exceed half the number of lateral CGH pixels in the hogel. In the case of a FP system the spatial resolution may not exceed half the total number of pixels in the hogel. However, for some embodiments including full parallax, the spatial resolution does not exceed half the number of vertical CGH pixels in the hogel nor exceed the number of lateral pixels.

For a simple image, an initial render may be used to produce an image buffer and a depth buffer containing the color and relative depth of each pixel in the 3D image. The depth may be further quantized and a color buffer produced for each depth plane. For more complicated images (such as being able to focus through translucent surfaces), the scene can be rendered in a progressive fashion (e.g. from front to back) generating a color buffer for each depth plane.

Figure 5:
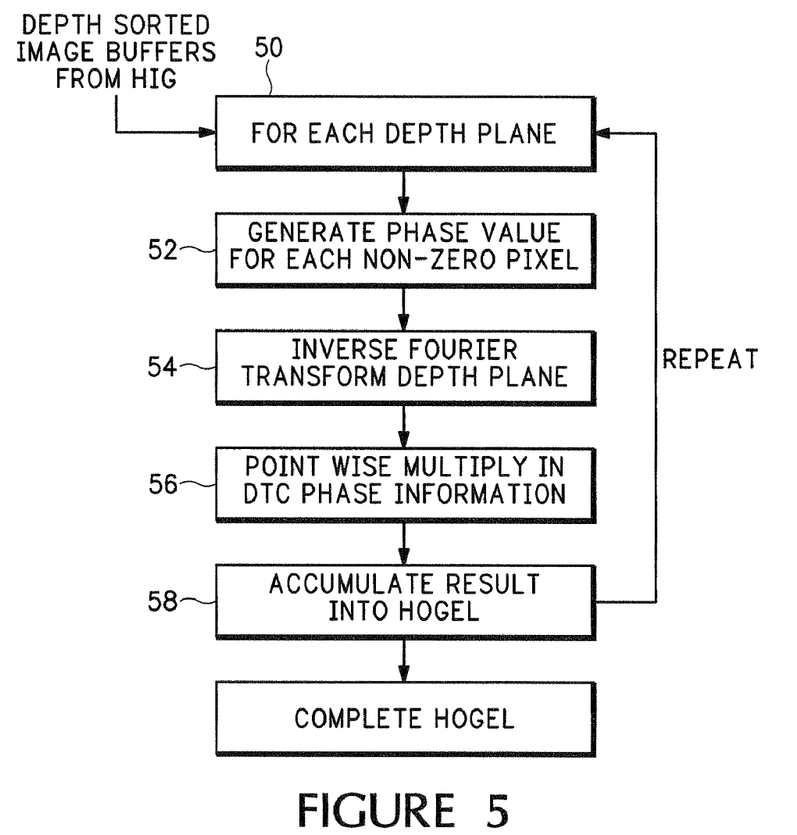
FIG. 5 illustrates a hogel computational core method.

Referring to the flow chart of FIG. 5, it is shown how the hogel computational core (HCC) operation 34 of FIG. 4 takes the image data in the form of depth sorted image buffers from the HIG operation 32. This data is then converted, by reference to the look-up table produced by the DTC operation 30 of FIG. 4, into the information that is written to each hogel in order to build up a CGH that is capable of diffracting light to produce the required 3D image.

In one embodiment, the HCC operation 34 involves a first sub-operation 50 of taking the image points, as calculated by the HIG operation 32, for a first depth plane of a first hogel. A phase value is then associated with each non-zero image point (sub-operation 52) and the result is inverse Fourier transformed (sub-operation 54) to produce diffraction information that will replay the image points of the first hogel depth plane. The diffraction information is then point wise multiplied with the appropriate phase values from the depth look-up table (sub-operation 56) such that the image points to be displayed will be replayed at the designated depth plane. After accumulating the diffraction pattern for the first depth plane into the first hogel (sub-operation 58), the above operations are repeated for the remaining depth planes of the hogel.

The operations used to create a CGH for one hogel can be performed independently of other hogel calculations. In other words, the computation for one hogel can be performed simultaneously with computations for other hogels. The overall computation can therefore be parallel pipelined on a hogel basis. Alternatively, if computation speed is not an issue, the process may be repeated in series for each hogel.

The LUT described in various embodiments herein may be more than two thousand times smaller than that described in WO 02/39194 for a horizontal parallax only CGH with a 2048 image point lateral resolution (spatial resolution at a given depth plane), 1024 hololines (image rows), 128 quantized depth planes and 4096 lateral hogel pixels.

In one embodiment, the number of accumulations per hogel can be estimated for a non-transparent geometry to be around $13 \times 10^9$. This is calculated by multiplying the summation of the FFT load and pointwise multiplication operations (i.e. (11×8192)+8192) with the number of depth planes (128) and the number of rows (1024). WO 02/39194 discloses around $6 \times 10^9$ calculations; i.e. the product of the number of visible image points (which is 1434 if a 70% fill ratio is assumed), the entries per point (4096) and the number of rows (1024). In certain embodiments, more than double the number of accumulation operations as compared to WO 02/39194 may be used to calculate diffraction data for a CGH hogel.

In the case of a transparent geometry rather than a non-transparent geometry, the computation load may be unchanged at around $13 \times 10^9$. If it is assumed that the 70% pixel fill ratio is retained, and that 43% of pixels have a transparent component, DS algorithms require $8 \times 10^9$ calculations to produce the CGH for a hogel. In this case, the number of calculations in the HCC operation 34 is only around 1.4 times more than the DS algorithm.

However, an embodiment operated in a holographic stereogram mode (i.e. one depth plane with full spatial resolution) may decrease the number of accumulations per hogel by a factor of eighty compared with the DS technique. A decrease in computational load of a factor of forty can also be achieved, compared with DS techniques, to produce a CGH that replays volume data ($13 \times 10^9$ calculations compared with $550 \times 10^9$ calculations).

The above estimates for the number of accumulations per hogel assume that a full FFT is performed per row. Given that half the image will be blank (to account for the conjugate) the full FFT can be trivially performed using only half the data. Greater savings can be found using sparse FFTs and due to the fact that most of the color buffer for a given plane will be blank.

In the case of a non-transparent or transparent geometry, the use of a trivial sparse FFT can reduce the number of accumulations per hogel from $13 \times 10^9$ to around $6 \times 10^9$. For a non-transparent geometry, the number of accumulations may be approximately equal to those in the DS technique. For a transparent geometry, the computational load actually becomes around 1.3 times less than that for the DS technique.

The use of a trivial sparse FFT can also be used to reduce the number of accumulations required to describe a transparent geometry in holographic stereogram mode from $1 \times 10^8$ to around $5 \times 10^7$, which is around 160 times fewer hogel accumulations than the DS techniques. In the case of a fully volumetric geometry, the use of a sparse FFT can also reduce the number of accumulations from around $13 \times 10^9$ to $6 \times 10^9$; this is a factor of 90 reduction in the number of calculations compared with the DS techniques.

In designing a computational architecture of practical use in an interactive CGH system there are three main implementation issues to consider, namely: (a) the size of any LUT's, (b) the fundamental computational load and (c) the ability to apply real time optimization to reduce the computation load requirement in dynamic situations.

In respect of issue (a), a small LUT requirement means that computational nodes do not need to be locked into a single hogel-processing pipeline. Techniques such as pixel prioritization can thus be more efficiently applied to the computational architecture and the computational resources may be dynamically moved from one hogel-processing pipeline to another. In the DS techniques, the very large LUTs limit the practical implementation of such schemes. Furthermore, the smaller LUT allows the computations to be performed using thinner computational nodes having reduced memory requirements, for example using FPGA or graphics cards. Previously, the use of such hardware was impractical due to the large LUT requirement.

In respect of issue (b) various embodiment may, in some cases, have a higher computational load than the DS methods. However, as a general rule and for a transparent surface geometry, the various embodiments have a roughly equivalent computational load to DS techniques when around 80 depths planes are provided. In certain cases, the computational load is greatly decreased. Various techniques (e.g. sparse FFT) can also be used to reduce the computation load further.

Finally, in respect of issue (c), in DS techniques the number of image points that are generated for a hogel drive the computational load. However, with various embodiments disclosed herein, it is the number of depth planes that drives the computational load.

For real time optimizations implemented using the DS technique it is usual to reduce the number of image points (i.e. lateral spatial resolution) to enable sufficiently rapid refresh. However, of various embodiments discloses herein, the depth resolution may be reduced while maintaining the lateral spatial resolution. In general the reduction of depth resolution will be far less noticeable than the reduction of lateral spatial resolution. As a result, the computational load may be tuned over a wider range of values, resulting in more flexibility for a real time system implementation.

Figure 6:
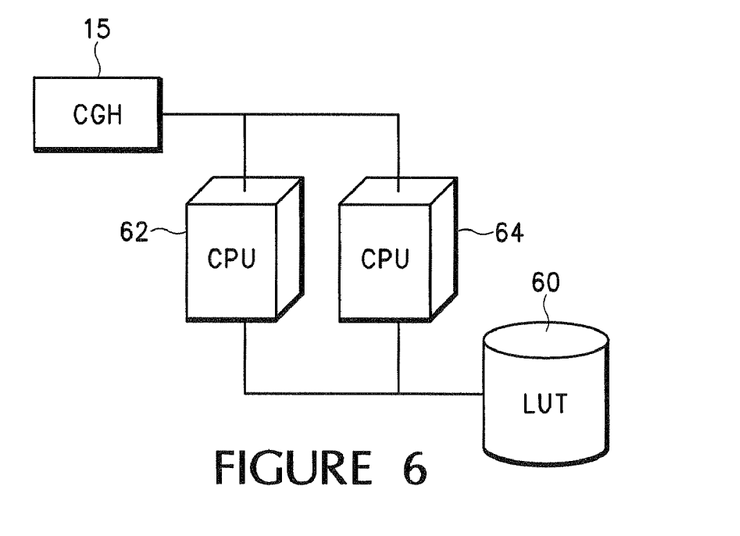
FIG. 6 illustrates a CGH system including a pre-computed diffraction look-up table.

FIG. 6 illustrates a CGH system including a pre-computed diffraction look-up table 60, replay optics such as replay optics 15 of FIG. 1, and one or more processors, such as processor 62 and processor 64.

In one embodiment, a method of producing a computer generated hologram (CGH) comprises dividing the CGH into one or more hogels, and calculating diffraction fringe information for at least one of the hogels. Calculating diffraction fringe information for at least one of the hogels includes reference to a pre-calculated look-up table (LUT). The LUT comprises a plurality of phase entries corresponding to a plurality of image points within the three dimensional image replay volume of the CGH.

A CGH may be generated by reference to a LUT comprising a phase entry corresponding to each image point in the 3D image replay volume of the CGH. The LUT is image independent, and can thus be pre-calculated. The image to be replayed in the 3D image replay volume of the CGH is constructed by selecting appropriate image points by reference to the LUT.

A LUT of various embodiments is, for a given number of image points, significantly smaller in size than the LUTs of DS techniques. For example, the LUT used in the method of WO 02/39194 stores diffraction fringe data for each potential image point in the 3D image volume. The diffraction fringe data stored for each image point may comprise several thousand pieces of data (i.e. enough information to reproduce the calculated diffraction fringe pattern of a hogel). The hogel vector elements entries of the LUT of the Lucente DS technique are of a similar size to the decoded fringe data of WO 02/39194, but also require a computationally expensive decoding step to be performed to produce the diffraction fringe information. In contrast, an example LUT disclosed herein may contain only a single phase value (i.e. an entry having real and imaginary parts) for each image point.

The amount of data that may be stored in a smaller LUT and accessed during CGH computation is greatly reduced. This can reduce the CGH calculation time and also enables calculations to be performed on "thinner" computational nodes that have reduced memory requirements. For example, field programmable gate arrays (FPGA) or graphics cards will have sufficient memory to store the LUT used in a CGH calculation. The cost and technical complexity of implementing various embodiments disclosed herein can thus be lower than that associated with performing the DS methods.

The plurality of phase entries correspond to a plurality of image points that are located at one or more, depth planes within the three dimensional image replay volume of the CGH. In other words, the three dimensional image replay volume of the CGH can be quantized into depth planes. The number of depth planes may be used to determine the depth resolution of the image, while the number of image points in a depth plane may be used to determine the lateral resolution.

Reducing the number of depth planes, while maintaining the number of images points per depth plane, can reduce the overall computational load associated with CGH generation without any reduction in lateral resolution. In dynamic 3D display systems (i.e. systems where fast computation times are required) the human eye has a lower sensitivity to a reduction in depth resolution compared to reductions in lateral resolution.

In various embodiments, a flexible CGH generation method can be readily tailored to the particular application required. The CGH may be divided into two or more hogels. The diffraction fringe information may be calculated for each, or only some, of the hogels forming the CGH.

Diffraction fringe information for a hogel may be calculated separately to the diffraction fringe information of other hogels of the CGH. Calculations may therefore be performed in parallel (e.g. by multiple computer nodes) to determine the diffraction fringe information for each of the two or more hogels. Furthermore, the small LUT requirement for each hogel means that computational nodes do not need to be strictly locked into a single hogel-processing pipeline and the computational resources may be dynamically moved from one hogel-processing pipeline to another.

The two or more hogels may be notionally divided into a first subset and one or more further subsets. Diffraction fringe information may then be calculated for the first subset prior to being calculated for the one or more further subsets. Viewer location may be determined with respect to the three dimensional image replay volume of the CGH, wherein the determined viewer(s) location may be used to select the hogels that are included in the first subset and the one or more further subsets.

So-called pixel prioritization techniques may be used to calculate the diffraction fringe information for a first sub-set of hogels prior to performing calculations for the other hogels. In this manner, a certain aspect of the 3D image may be calculated prior to other aspects of the image. Pixel prioritization allows, in a dynamic system, a certain view or views of the image to be displayed while the remainder of the image (or other preferred views) is being calculated.

A small LUT further allows such pixel prioritization to be more efficiently applied to the computational architecture. Large LUTs limit the practical implementation of such schemes. It should be noted that, for non time critical applications or for limited processing resource availability, each hogel calculation may be performed in series.

Calculating diffraction fringe information for at least one of the hogels may include a rendering operation that converts a representation of the image to be displayed into one or more depth quantized image slices. The image to be displayed, or so-called virtual image, is thus further quantized in depth. For example, a 3D image to be displayed is mathematically described by 2D image slices at each of a plurality of depth planes. Each image slice may be produced by the rendering operation corresponding to a depth plane within the three dimensional image replay volume of the CGH for which phase entries are stored in the LUT.

A Fast Fourier Transform (FFT) may be performed to convert each depth quantized image slice into diffraction fringe information, wherein said diffraction fringe information subsequently being point-wise multiplied with phase entries of the LUT such that each image slice will be replayed at the required depth plane within the 3D image replay volume of the CGH.

As described above, the image to be displayed may be split into one or more depth quantized image slices. Performing a FFT on an image slice produces diffraction fringe information that would replay the particular 2D image slice at the Fourier plane of the optical replay system. However, if the diffraction fringe information produced by the FFT step is point-wise multiplied with appropriate phase entries stored in the LUT, the 2D image slice will be replayed at a given depth plane within the 3D image replay volume of the CGH. The LUT entries can be used to translate each point of an image slice away from the Fourier plane to a calculated depth plane within the 3D image replay volume of the device. In this manner, a 3D image can be constructed by replaying a plurality of 2D image slices.

The FFT may be performed on each depth quantized image slice as a sparse FFT. The calculation may thus be simplified by being performed on non-zero intensity image points within the particular image slice. The computational load associated with the FFT may be reduced further if the conjugate image is not rendered. The skilled person would also recognize the various alternative transforms could be used.

Each hogel may include a plurality of pixel elements. The CGH may be divided into a plurality of hogels that are arranged to allow an image to be replayed having parallax in a single plane. A horizontal (or vertical) parallax only CGH may be produced by appropriate selection of the pixel elements that define the hogels. Alternatively, the CGH may be conveniently divided into a plurality of hogels that allow a full parallax 3D image to be replayed. The skilled person would recognize that the hogels may also be selected to provide different amounts of horizontal and vertical parallax as required.

The calculated CGH may be arranged to replay a 2D image at one depth plane. In this manner, a CGH can be used to display a 2D image. This would allow, in the case of a dynamic display system using the method, a 2D image to be displayed. The calculation of a 2D image requires much less processing power than a full 3D image and may thus be quickly updated, possibly in real time.

In various embodiments, the phase information contained in the LUT is initially calculated for each hogel using a skew factor to compensate for the position of the hogel relative to the optical axis of the CGH replay system.

The LUT can be arranged to comprise phase entries for more than one wavelength. For example, the LUT may contain phase entries for monochrome, red, green and blue channels. This would allow a monochrome or color image to be replayed from the CGH as required. A smaller size of the LUT allows such a system to be more readily implemented; large LUT would make such an arrangement impractical.

A computer program carrier may be provided that stores a computer program implementing the operations described herein. For example, a CD-ROM, floppy disk, tape, hard drive or programmable ROM may be used. A computer system may be provided that is running the computer program implementing the operations described herein. The computer system may comprise a single computer or a plurality of computer nodes which may be connected via a network. The various nodes of the network may be co-located or located at different sites. As described above, the various hogel calculations can be performed independently allowing multiple parallel calculations to be performed.

A computer generated hologram (or at least one hogel of a such a CGH) may be stored as diffraction information on a physical medium from which an image can be directly optically replayed. For example the CGH, or part thereof, may be written to photographic film or etched into a medium using electron beam lithography etc. Alternatively, the CGH may be stored as electronic data (e.g. on a hard drive, CD-ROM, floppy disk or in a computer memory etc) that can subsequently be written to an appropriate diffraction panel. The electronic data forming at least some of the CGH may also be in transit across a computer network or temporarily stored on a server.

A three dimensional display apparatus may comprise a diffraction panel for displaying a computer generated hologram (CGH) and CGH computation means. The computation means may be arranged to notionally divide the CGH into one or more hogels and to calculate diffraction fringe information for at least one of the hogels. The computation means may be further arranged to store a look-up table (LUT) that comprises a plurality of phase entries corresponding to a plurality of image points within the three dimensional image replay volume of the CGH.

The 3D display may further comprise a diffraction panel to display the calculated CGH. In various embodiments, the term "diffraction panel" is used to describe a panel (e.g. a spatial light modulator) capable of being programmed to diffract light in a controlled manner before or after diffraction information is written to it. Once the diffraction panel has diffraction information written to it, the diffraction panel may be interchangeably termed a CGH.

A coherent radiation source may be arranged to illuminate the diffraction panel. For example, a laser or lasers may be provided. In the case of color systems, the lasers may be of different wavelength.

Replay optics may be located between the diffraction panel and the three dimensional image replay volume of the CGH. For example, the optical arrangement described with reference to FIG. 1 may be implemented. The skilled person would also appreciate the wide variety of alternative replay optical arrangements that could be used.

The diffraction panel may comprise at least one re-configurable spatial light modulator (SLM). If sufficiently high resolution, a single SLM may be used. Alternatively, a number of SLMs may be provided. For example, a separate SLM may be provided for each color channel in a color image display system.

At least one re-configurable spatial light modulator may be an electrical addressed spatial light modulator. For example, a liquid crystal or micro-mirror SLM may be provided. The SLM may be reflective or transmissive.

The at least one re-configurable spatial light modulator may also be an optically addressed spatial light modulator (OASLM). The CGH may conveniently be written to the OASLM using the Active Tiling® system described previously in U.S. Pat. No. 6,437,919 and WO00/40018. This arrangement is particularly suited to providing high pixel count diffraction panels that enable high resolution 3D image replay.

The invention claimed is:

1. A method comprising:
    separating a three dimensional (3D) image volume into a plurality of depth planes;
    computing phase information for image points in the plurality of depth planes;
    generating phase values for non-zero pixels of the 3D image volume;
    performing a Fourier transform on the 3D image volume to obtain transformed image data; and
    point-wise multiplying the transformed image data with the phase information to form a diffraction pattern of a computer generated hologram (CGH).

2. The method of claim 1, wherein the phase information is computed off-line and stored in a look-up table (LUT).

3. The method of claim 1, further comprising:
    identifying color and depth information of the 3D image volume based on what is displayed by corresponding hogels of the CGH.

4. The method of claim 3, further comprising accumulating a result of the multiplied transformed image data and the phase information into the corresponding hogels.

5. The method of claim 3, wherein the color and depth information is computed from a rendering operation that is implemented using ray tracers or rasterizers.

6. The method of claim 1, further comprising determining a phase factor to project a complex plane description at a required depth in the 3D image volume.

7. The method of claim 1, wherein the 3D image volume is separated into the plurality of depth planes based on a quadrature phase factor to change an apparent depth plane, and further based on a linear phase factor to accommodate a skew from performing an off-axis Fourier transform.

8. The method of claim 1, further comprising:
    rendering the 3D image volume in a progressive fashion; and
    generating color buffers for the plurality of depth planes.

9. An apparatus, comprising:
    means for identifying image points for a depth plane of a hogel of a computer generated hologram (CGH);
    means for performing a Fourier transform on phase values associated with non-zero image points of the CGH to produce diffraction information;
    means for point-wise multiplying the diffraction information with the phase values to form a diffraction pattern;
    means for accumulating the diffraction pattern for the depth plane into the hogel to build up the CGH; and
    means for producing a three-dimensional (3D) image from the CGH.

10. The apparatus of claim 9, wherein the image data of the CGH is calculated as a depth sorted image buffer.

11. The apparatus of claim 9, further comprising means for diffracting light from the CGH to produce the 3D image.

12. The apparatus of claim 9, wherein the phase values are pre-calculated and stored in a look-up table (LUT).

13. The apparatus of claim 9, wherein the CGH is built up from a plurality of hogels associated with different depth planes.

14. The apparatus of claim 13, wherein the means for accumulating the diffraction pattern is configured to independently create the plurality of hogels.

15. A tangible computer-readable medium having stored thereon computer-executable instructions that, in response to execution by a computing system, cause the computing system to perform operations comprising:
    dividing a three-dimensional (3D) image volume into depth quantized image slices;
    converting the depth quantized image slices into diffraction fringe information;
    point-wise multiplying the diffraction information with phase entries associated with non-zero image points of a computer generated hologram (CGH) associated with the 3D image volume to calculate depth planes; and
    replaying the depth quantized image slices at the calculated depth planes to construct a 3D image from the CGH.

16. The computer readable medium of claim 15, wherein the operations further comprise translating image points of the depth quantized image slices away from one or more Fourier planes to the calculated depth planes.

17. The computer readable medium of claim 16, wherein converting the depth quantized image slices into the diffraction fringe information comprises performing a Fast Fourier Transform (FFT) on the depth quantized image slices.

18. The computer readable medium of claim 15, wherein the operations further comprise obtaining the phase entries as pre-calculated entries in a look-up table (LUT).

19. The computer readable medium of claim 18, wherein the phase entries in the LUT are pre-calculated using a skew factor to compensate for hogel positions relative to an optical axis of the CGH.

20. The computer readable medium of claim 15, further comprising causing light to be reflected from, or transmitted through, the CGH to construct the 3D image.

* * * * *

UNITED STATES PATENT AND TRADEMARK OFFICE
CERTIFICATE OF CORRECTION

PATENT NO. : 8,363,295 B2  
APPLICATION NO. : 12/830974  
DATED : January 29, 2013  
INVENTOR(S) : Wilson et al.

Page 1 of 1

It is certified that error appears in the above-identified patent and that said Letters Patent is hereby corrected as shown below:

In the Specification

In Column 1, Line 2, below Title, insert Heading -- CROSS-REFERENCE TO RELATED APPLICATIONS --, therefor.

In Column 4, Line 44, delete "p" and insert -- $p$ --, therefor.

In Column 4, Line 46, delete "p" and insert -- $p$ --, therefor.

In Column 5, Line 34, delete "DTC of operation" and insert -- DTC operation --, therefor.

In Column 10, Lines 26-27, delete "of a such a" and insert -- of a such --, therefor.

In the Claims

In Column 12, Line 22, in Claim 15, delete "computer-readable" and insert -- computer readable --, therefor.

Signed and Sealed this  
Eleventh Day of March, 2014

Michelle K. Lee  
*Deputy Director of the United States Patent and Trademark Office*